(12) United States Patent
Fletcher (10) Patent No.: US 10,572,840 B2
(45) Date of Patent: Feb. 25, 2020

(54) DYNAMICALLY SCHEDULING A JOB PLAN BASED ON WEATHER INFORMATION

(71) Applicant: International Business Machines Corporation, Armonk, NY (US)

(72) Inventor: James C. Fletcher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 15/638,563

(22) Filed: Jun. 30, 2017

(65) Prior Publication Data

US 2019/0005426 A1    Jan. 3, 2019

(51) Int. Cl.
*G06Q 10/06* (2012.01)
*G01W 1/00* (2006.01)

(52) U.S. Cl.
CPC ......... *G06Q 10/06311* (2013.01); *G01W 1/00* (2013.01); *G06Q 10/063116* (2013.01); *G01W 2001/006* (2013.01)

(58) Field of Classification Search
CPC .... G06Q 10/06311; G06Q 10/063116; G01W 1/00; G01W 2001/006
See application file for complete search history.

(56) References Cited

U.S. PATENT DOCUMENTS

| | | | |
|---|---|---|---|
| 6,643,582 B2 | 11/2003 | Adachi et al. | |
| 9,386,432 B2 | 7/2016 | Chu et al. | |
| 2003/0004780 A1* | 1/2003 | Smith | G06Q 10/06 705/14.5 |
| 2003/0046304 A1 | 3/2003 | Peskin et al. | |
| 2003/0107490 A1* | 6/2003 | Sznaider | G08B 21/10 340/601 |
| 2008/0126025 A1* | 5/2008 | Seppanen | G06Q 10/06 703/2 |
| 2011/0145155 A1* | 6/2011 | Walter | G06Q 10/067 705/301 |
| 2015/0339619 A1 | 11/2015 | Dumont et al. | |
| 2016/0026940 A1 | 1/2016 | Johnson | |

FOREIGN PATENT DOCUMENTS

| | | |
|---|---|---|
| JP | 2011197975 A | 10/2011 |
| KR | 20050096058 A | 10/2005 |

OTHER PUBLICATIONS

Ballesteros-Pérez et al., Climate and construction delays: case study in Chile, Engineering, Construction and Architectural Management vol. 22 No. 6, 2015, pp. 596-621 (Year: 2015).*

Anonymous Inventors; Ttl: Applying the Optimal Job Plan Based on Changing Weather Conditions; Database: ip.com; ip.com No. IPCOM000247675D; Sep. 27 2016; 3 pages.

* cited by examiner

*Primary Examiner* — Nadja N Chong Cruz (74) *Attorney, Agent, or Firm* — Richard Wilhelm; Edell, Shapiro & Finnan, LLC (57) ABSTRACT

A work order is dynamically scheduled by a computer system based on an electronic work order that includes information describing one or more tasks and a weather threshold associated with the one or more tasks. Based on the work order, the system creates a job plan, determines an amount and type of resources needed to complete the job plan, and schedules a time on which the job plan is to be performed. The system may further periodically receive weather forecast information from one or more weather information providers, and based on the weather forecast information, may initiate a job plan remedial process.

20 Claims, 3 Drawing Sheets

DYNAMICALLY SCHEDULING A JOB PLAN BASED ON WEATHER INFORMATION

BACKGROUND

1. Technical Field

Present invention embodiments relate to enterprise scheduling systems, and more specifically, to dynamically generating and/or updating a schedule for an enterprise job plan based on weather information received from one or more weather sources.

2. Discussion of the Related Art

Enterprise maintenance and repair operations (MROs) are often expensive and highly sensitive to weather conditions. For example, a job plan for paving a road could require a variety of skilled personnel, specialized equipment, and an uninterrupted number of hours of clear weather to successfully complete. Accordingly, inclement weather could result in millions of dollars of equipment and significant personnel being idle and unable to complete the job plan. As the costs associated with MROs have dramatically increased, so too have the costs associated with rescheduling these operations.

SUMMARY

According to an embodiment of the present invention, a system dynamically schedules a work order based on weather information. Initially, the system receives, via an electronic communications network, an electronic work order that includes information describing one or more tasks to be performed, and information describing a weather threshold, such as lack of rain or a certain temperature range, associated with the one or more tasks. A processor in the system creates a job plan that includes the one or more tasks and the weather threshold, determines an amount and type of resources needed to complete the one or more tasks, and schedules the one or more tasks to be performed based on an availability of the amount and type of resources needed to complete the one or more tasks. The system may further receive, via an electronic communications network, weather forecast information from one or more weather information providers, and based on the weather forecast information, predict whether or not the weather threshold associated with the one or more tasks will be met (e.g., whether or not a maximum probability of rain is exceeded) when the one or more tasks are scheduled to be performed. The weather forecast information may be received periodically, at predetermined times in advance of when the tasks are scheduled to occur, or upon demand. When the system predicts that the one or more weather thresholds will not be met (e.g., because a predicted probability of rain exceeds a threshold probability), the system may initiate a job plan remedial process (e.g., to reschedule, modify, or cancel the task). Embodiments of the present invention further include a method and computer program product for dynamically scheduling a work order based on weather information in substantially the same manner as is described above.

DETAILED DESCRIPTION

Present invention embodiments dynamically schedule a work order based on weather information. Initially, the system receives an electronic work order that includes information describing one or more tasks to be performed and information describing a weather threshold associated with the one or more tasks. The system creates a job plan that includes the one or more tasks and the weather threshold, determines an amount and type of resources needed to complete the one or more tasks, and schedules one or more times (e.g., one or more days or one or more time periods on one or more days) on which the one or more tasks are to be performed based on an availability of the amount and type of resources needed to complete the one or more tasks. The system may further periodically receive weather forecast information from one or more weather information providers, and based on the weather forecast information, predict whether the weather threshold associated with the one or more tasks will be met (e.g., not exceeded) or missed (e.g., exceeded) on the one or more times on which the one or more tasks are to be performed. When the system predicts that the one or more weather thresholds will be missed, the system may initiate a job plan remedial process that may include rescheduling the job plan based on the weather forecast information to a different time (e.g., a different day or a different time on the original day) during which the required weather thresholds can be met.

Present invention embodiments may therefore utilize a variety of weather services that can provide real-time weather information that may be used to predict an optimal time to schedule a job plan that minimizes the costs and/or risks associated with required weather conditions. For example, the system may automatically update a schedule for a job plan associated with a work order to pave a road based on real-time weather information indicating that a storm formation or rain conditions may occur during the originally scheduled time. In so doing, the system may automatically reschedule the job plan to take place during a new time on which neither rain nor storm conditions are expected to occur, or are predicted at a risk level acceptable to proceed. Accordingly, present invention embodiments describe a dynamic scheduling system that may incorporate real-time weather information into automated scheduling decisions to dramatically increase resource productivity, such as scheduling temperature sensitive tasks at a time more aligned with optimal temperatures.

Figure 1:
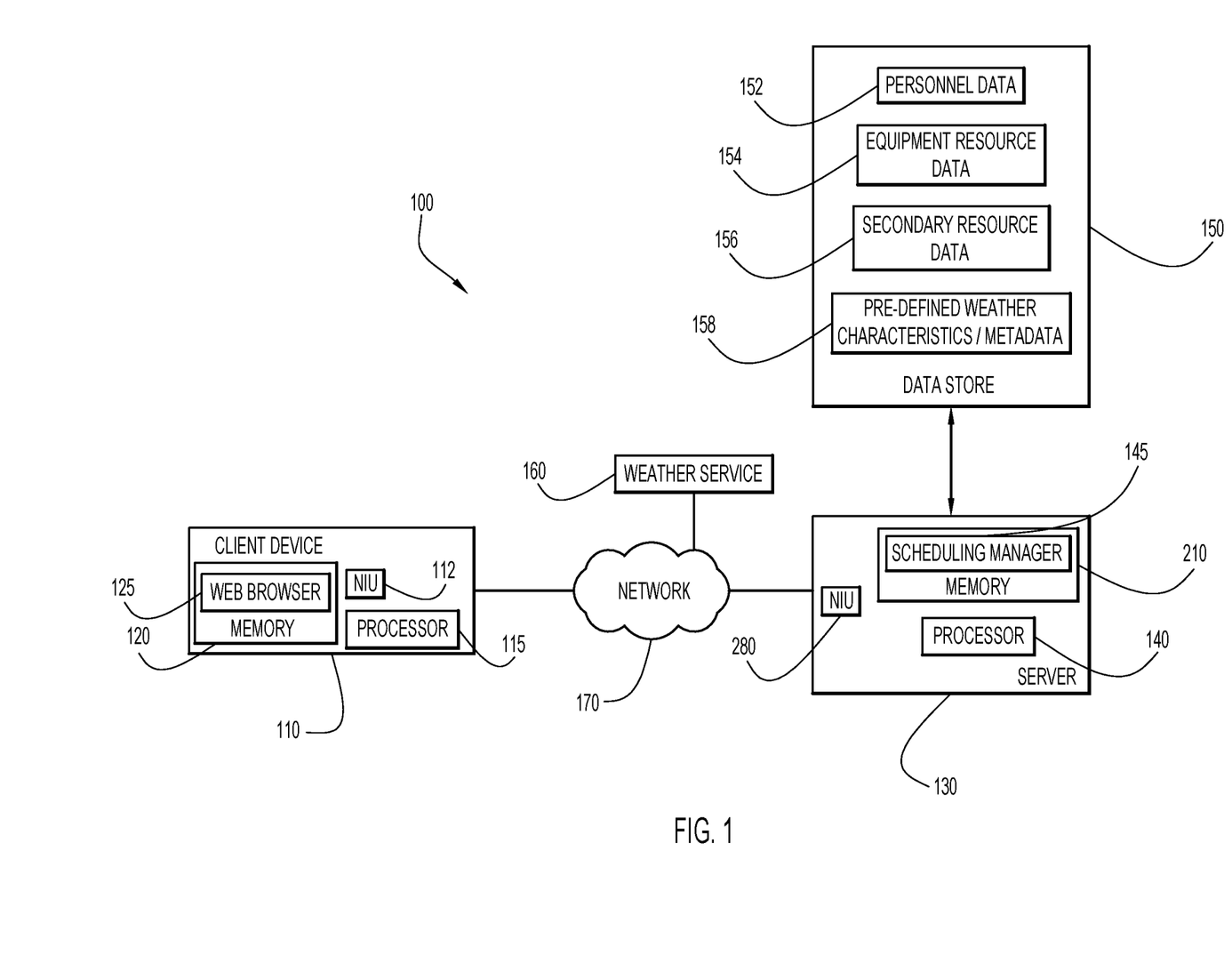
FIG. 1 is a diagrammatic illustration of an example computing environment for use with an embodiment of the present invention.

An example computing environment for use with present invention embodiments is illustrated in FIG. 1. Specifically, environment 100 includes a client device 110, one or more servers 130, and one or more data stores 150. Server 130 may comprise a processor 140, a network interface unit 280, and a memory 210 storing program instructions defining one or more scheduling managers 145, which are executable by the processor to schedule one or more work orders based on resource availability and weather forecast information. Server 130, client device 110, and data store 150, may be remote from each other and communicate over a network 170. Server 130 and/or client device 110 may also communicate with one or more weather services 160 over network 170. Network 170 may be implemented by any number of any suitable communications media (e.g., wide area network (WAN), local area network (LAN), Internet, Intranet, etc.). Alternatively, server 130, client device 110, data store 150, and one or more weather services 160 may be local to each other, and communicate via any appropriate local communication medium (e.g., local area network (LAN), hardwire, wireless link, Intranet, etc.).

Client device 110 may comprise a processor 115, a memory 120, a network interface unit 112, and one or more web browsers 125 stored in memory 120 and executable by processor 115 to enable a user associated with client device 110 to transmit a request to scheduling manager 145 in server 130 to schedule one or more work orders, which in response, may create and schedule a job plan to complete the one or more work orders. Accordingly, client device 110 may forward to server 130 information related to the one or more work orders, including descriptions of the one or more tasks to be performed and weather threshold information associated with the one or more tasks. In response, client device 110 may receive from server 130 a job plan including a schedule to complete the one or more work orders.

As further shown in FIG. 1, server 130 is in communication with data store 150, which may store personnel data 152, primary resource data 154, secondary resource data 156, and pre-defined weather characteristics/metadata 158. Personnel data 152 may include information related to the employees of an enterprise associated with a work order received from client device 110 (e.g., roles, skills, billing rates, availability, scheduled vacations, etc.). Primary resource data 154 may include availability information associated with assets and/or resources needed to complete one or more job plans. For example, equipment resource data 154 may store availability information related to machinery (e.g. trucks, pavers, earth movers, etc.), equipment and/or supplies (e.g., asphalt, tar, rocks, etc.) needed to pave and/or repair one or more roads.

Similarly, secondary resource data 156 may include information associated with assets and/or resources needed to support the completion of one or more job plans (e.g., financial assets and/or capital, logistics and/or supply chain scheduling, etc.). Pre-defined weather characteristics/metadata 158 may further include weather information and/or forecasts related to one or more job plans and/or associated location data. For example, server 130 may periodically receive weather information including one or more weather forecasts from one or more weather services 160 related to one or more specific locations associated with one or more job plans and forward the weather information to data store 150. According to a present invention embodiment, weather information may include precipitation information, barometric pressure information, temperature information, wind information and/or radar-based climate information.

Accordingly, scheduling module 145 may access information stored in personnel data 152, primary resource data 154, secondary resource data 156 and/or pre-defined weather characteristics/metadata 158 to generate and schedule a job plan including one or more work orders received from client device 110.

Initially, server 130 receives, from a user associated with client device 110, a request to schedule one or more work orders. After receiving the request, which may describe one or more tasks to be performed at a specific location and may include one or more weather thresholds associated with the one or more tasks, scheduling manager 145 in server 130 may generate a job plan based on the one or more tasks to be performed. Server 130 may further periodically receive, from one or more weather services 160, weather information including one or more weather forecasts. Based on resource availability information and the weather information received from the one or more weather services 160, scheduling manager 145 may determine a time (e.g., one or more days or one or more times on one or more days) on which the personnel and resources needed to complete the one or more work orders are available and on which the one or more weather thresholds are predicted to be met. Accordingly, scheduling manager 145 may generate scheduling information associated with a job plan based on the determined time and send the job plan and scheduling information to client device 110 for display to a user.

Figure 2:
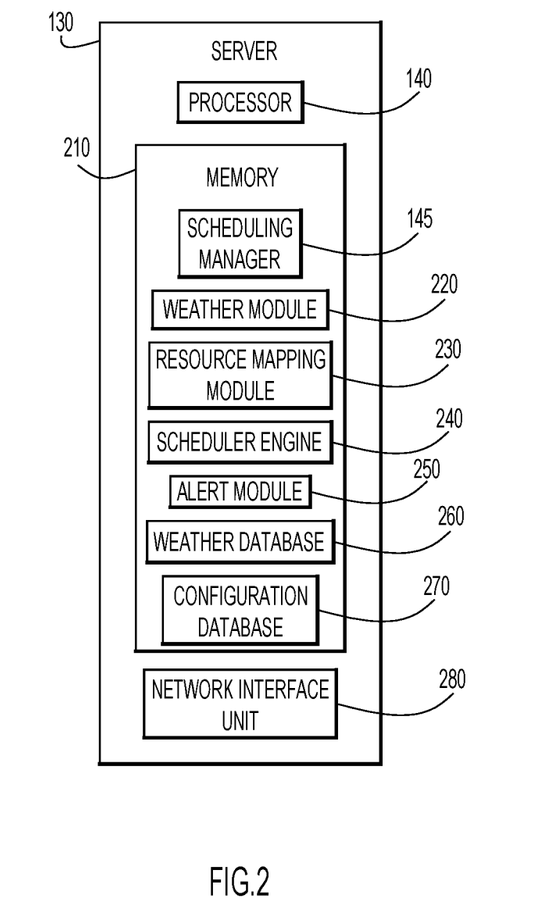
FIG. 2 is a block diagram of an example server system for use in the computing environment of FIG. 1 according to an embodiment of the present invention.

Reference is now made to FIG. 2, which shows an example block diagram of server 130 configured to dynamically schedule a work order based on weather information according to present invention embodiments. It should be understood that there are numerous possible configurations for server 130 and FIG. 2 is meant to be an example of one of the possible configurations.

Server 130 may be implemented by any conventional or other computer systems preferably equipped with a display or monitor, a base (e.g., including at least one processor 140, one or more memories 210 and/or internal or external network interfaces or communications devices 280 (e.g., modem, network cards, etc.), optional input devices (e.g., a keyboard, mouse or other input device), and any commercially available and custom software (e.g., server/communications software, scheduling manager, etc.).

The network interface unit 280, for example, may be an Ethernet card or other interface device that allows server 130 to communicate over communication network 160. Network interface unit 280 may further include wired and/or wireless connection capabilities. Processor 140 may include a collection of microcontrollers and/or microprocessors, for example, each configured to execute respective software instructions stored in the memory 210. Portions of memory 210 (and the instruction therein) may be integrated with processor 140.

Memory 210 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 210 may comprise one or more computer readable storage media (e.g., a memory device) encoded with software comprising computer executable instructions and when the software is executed (e.g., by processor 140) it is operable to perform the operations described herein. For example, memory 210 stores, or is encoded with, instructions or modules for scheduling manager 145, which is configured to analyze personnel and resource information as well as weather information received from one or more weather services 160 to generate, schedule and/or update a job plan comprising one or more work orders. Optionally, client device 110 and/or server 130 may, individually or in combination, include scheduling manager 145 to perform the receiving and analyzing of personnel, resource and/or weather information to generate, schedule and/or update a job plan to complete one or more work orders.

Accordingly, memory 210 may store, or is encoded with, instructions for scheduling manager 145 to perform overall control of the scheduling operations described herein by receiving personnel, resource, and weather information and, in response, generating, scheduling and/or updating one or more job plans based on the personnel, resource and weather information. Scheduling manager 145 is further configured to receive work order information associated with one or more work orders (e.g., weather threshold information, start and end date requirements, etc.) from client device 110 and store the received work order information, personnel information, and/or resource information in configuration database 270, and store the received weather information in weather database 260 for further scheduling operations. According to an embodiment of the present invention, scheduling manager 145 may further send an alert signal to client device 110 to notify a user associated with client device 110 that a job plan should be updated, rescheduled, and/or canceled due to changes in personnel, resource and/or weather forecasts.

Memory 210 may further store and/or be encoded with instructions for weather module 220, resource mapping module 230, scheduler engine 240 and alert module 250. Weather module 220 is further configured to analyze weather information periodically received from one or more weather services 160 and to determine one or more weather forecasts related to one or more scheduled times based on the received weather information. For example, based on received weather information, weather module 220 may determine that rain conditions will likely occur on one or more times associated with an existing job plan. According to an embodiment of the present invention, weather module 220 may determine whether one or more weather thresholds associated with one or more work orders are expected to be missed (e.g., exceeded) based on the one or more weather forecasts determined from the received weather information.

Resource mapping module 230 may analyze one or more tasks included in one or more work orders received from client device 110 to determine the personnel and/or resource requirements needed to successfully complete the one or more tasks. Based on personnel and resource availability information, resource mapping module 230 may be further configured to correlate availability information associated with the personnel and/or resources needed to complete the one or more tasks with one or more possible times (e.g., one or more dates or one or more time periods on one or more dates) on which the one or more work orders may be scheduled. For example, based on personnel and resource availability information, resource mapping module 230 may determine one or more calendar days and/or times on which repair operations to one or more roads may be feasibly scheduled which meets the specified weather thresholds.

Scheduler engine 240 may be configured to schedule and/or update one or more work orders received from client device 110, based on weather conditions determined by weather module 220 and resource availability determined by resource mapping module 230. For example, scheduler engine 240 may schedule road repair operations to occur on consecutive days on which the personnel and resources needed to complete the repair operations are available and the weather information indicates that the weather thresholds associated with the repair operation are expected to be met (e.g., not exceeded).

Alert module 250 may be configured to generate an alert signal, based on weather information received from one or more weather services 160, notifying a user that one or more weather thresholds associated with one or more work orders is likely to be exceeded. Accordingly, server 130 may send an alert signal to client device 110 indicating that a user associated with client device 110 should reschedule, modify and/or cancel one or more work orders. According to an embodiment of the present invention, scheduling manager may automatically initiate a remedial process to reschedule, modify and/or cancel one or more work orders when alert module 250 generates an alert signal indicating that one or more weather thresholds are expected to be missed (e.g., exceeded). For example, scheduling manager 145 may automatically update a job plan by rescheduling personnel and resources needed to complete road repair operations based on an alert signal received from alert module 250.

Scheduling manager 145, weather module 220, resource mapping module 230, scheduler engine 240, and alert module 250 may include one or more modules or units to perform the various functions of present invention embodiments described below. The various modules (e.g., scheduling manager, weather module, resource mapping module, scheduler engine, alert module, etc.) may be implemented by any combination of any quantity of software and/or hardware modules or units, and may reside within memory 210 of server 130 for execution by processor 140. Accordingly, as illustrated in FIG. 2, the various modules, (e.g., scheduling manager, weather module, resource mapping module, scheduler engine, alert module, etc.) may be implemented within separate modules that may reside in memory 210 of server 130. Alternatively, the various modules (e.g., scheduling manager, weather module, resource mapping module, scheduler engine, alert module, etc.) may be implemented within a single module (e.g., scheduling manager) residing in memory 210.

Memory 210 may further provide weather database 260, which stores various weather information used and received by scheduling manager 145 to dynamically schedule one or more work orders based on the weather information. For example, weather database 260 may store one or more weather forecasts related to a plurality of calendar days (e.g., a week, two weeks, a month, etc.) periodically received from one or more weather services 160. Weather database 260 may be implemented by any conventional or other database or storage unit, may be local to or remote from server 130, and may communicate via any appropriate communication medium (e.g., local area network (LAN), wide area network (WAN), Internet, hardwire, wireless link, Intranet, etc.). The weather database may also be implemented through the use of a web service to simply query the weather from a remote weather services without the need to retain the specific data locally within a database.

Memory 210 may further provide configuration database 270, which stores information used and received by scheduling manager 145 for dynamically scheduling a work order based on weather information. Accordingly, configuration database 270 may store one or more tasks associated with one or more work orders and may further store job threshold information associated with the one or more work orders. According to an embodiment of the present invention, job threshold information may include one or more pre-configured weather thresholds associated with one or more weather conditions related to one or more calendar days. For example, configuration database 270 may store a work order to repair one or more roads and associated job threshold information requiring that the forecasted probability of rain for each of the one or more calendar days on which the work order is to be scheduled may not exceed 65 percent. Configuration database 270 may be implemented by any conventional or other database or storage unit, may be local to or remote from server 130, and may communicate via any appropriate communication medium (e.g., local area network (LAN), wide area network (WAN), Internet, hardwire, wireless link, Intranet, etc.).

Figure 3:
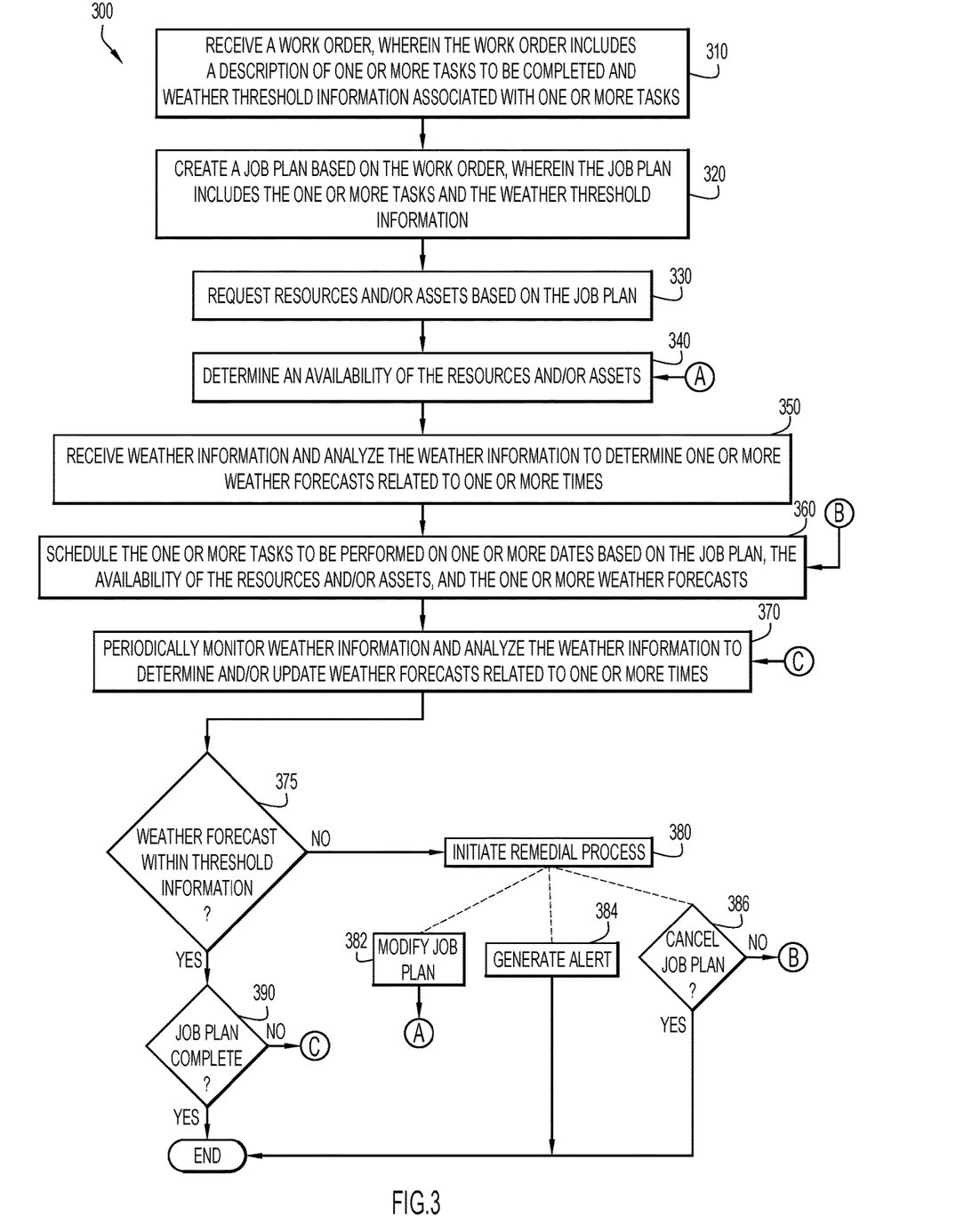
FIG. 3 is a procedural flow chart illustrating a manner of dynamically scheduling a job plan based on weather information according to an example embodiment of the present invention.

With reference to FIG. 3, there is depicted a procedural flow chart illustrating a method 300 of dynamically scheduling a work order based on weather information according to an embodiment of the present invention. Method 300 may be performed primarily by server 130.

Initially, server 130 receives a work order from client device 110 that includes a description of one or more tasks to be completed and may also include weather threshold information associated with the one or more tasks, at step 310. Weather threshold information may comprise one or more pre-configured thresholds and/or requirements related to one or more specific weather conditions. For example, weather threshold information may comprise a maximum estimated likelihood of precipitation, a minimum estimated temperature requirement and/or a minimum continuous interval during which a specific weather condition (e.g., no rain, minimum temperature, etc.) is satisfied. In an embodiment, weather threshold information may be provided automatically by the system using a machine learning model. For example, a machine learning model may be stored in memory 210 and historical data on tasks performed, weather conditions existing at the time the tasks were performed, and outcomes (e.g., successful, partially successful, or unsuccessful) may be stored in data store 150. The machine learning model may be trained using the historical data and used to establish weather threshold information for each of the tasks associated with a work order. The model may also be used to dynamically adjust weather threshold information as historical data is updated.

A job plan is created based on the work order, wherein the job plan includes the one or more tasks to be completed and the job threshold information, at step 320.

Resources and/or assets are requested based on the job plan, at step 330, and an availability of the resources and/or assets is determined, at step 340. For example, scheduling manager 145 may send a request for equipment and personnel to repair one or more roads to an administrative server associated with road MROs, and availability may be determined based on receipt of responses confirming or denying the request.

Weather information is received from one or more weather services 160 and is analyzed to determine one or more weather forecasts related to the scheduled time (e.g., one or more calendar days), at step 350. Accordingly, weather module 220 may receive weather information from one or more weather services 160 associated with specific location information and the scheduled time (e.g., one or more calendar days), and based on the received weather information, may generate and/or update one or more weather forecasts related to the specific location information and the scheduled time. For example, weather module 220 may receive weather information from one or more weather services 160 indicating that a cold front likely will move into the New England region on a given date, and, in response, may generate a weather forecast indicating that rain is likely and a specific percentage chance to occur in the Boston area on the given date.

One or more tasks to be performed are scheduled to be performed at one or more times (e.g., on one or more dates or one or more time periods on one or more dates) based on the job plan, the availability of the resources and/or assets, and the one or more weather forecasts, at step 360.

Weather information is periodically monitored and analyzed to determine and/or update weather forecasts related to the scheduled times (e.g., on one or more dates), at step 370.

A determination is made whether each of the weather forecasts related to the one or more scheduled times (e.g., one or more dates) is within or otherwise meets the weather threshold information included in the work order, at step 375.

When it is determined that one or more of the weather forecasts related to the one or more scheduled times is not within or otherwise misses the job threshold information, a job plan remedial process is initiated, which may alternatively comprise modifying the job plan, generating an alert, or canceling the job plan, at step 380. The process may be performed for subordinate and dependent tasks as well which are dependent on this task to be completed before they can be performed. For example, if a pre-configured threshold level indicates that a maximum estimated likelihood of rain for a specific location and date may be sixty percent, and a weather forecast generated by weather module 220 related to the specific location indicates that the likelihood of rain occurring on the specific date is seventy percent, server 130 may determine that the weather forecast does not meet the specified threshold because the chance of rain exceeds sixty percent and, in response, the server may initiate a job plan remedial process. In an embodiment, the job plan remedial process may be initiated by the server automatically without user intervention or awareness.

When the job remedial process comprises modifying the job plan, the job plan is modified, at step 382, and, based on the modified job plan, an availability of the resources and/or assets is determined.

When the job remedial process comprises generating an alert, an alert is generated, at step 384, and process 300 ends. For example, server 130 may send an alarm signal to client device 110 to perform any type of alarm signal generation (e.g., ringing, music, audible alarm and/or device control, etc.) to notify a user that one or more weather forecasts have exceeded or otherwise missed one or more weather thresholds associated with a job plan, or the signal can be used to drive an automated rescheduling task without human intervention or awareness. Server 130 may further send a message, a text, and/or an email to client device 110 for display to a user associated with client device 110 indicating that one or more weather thresholds have been exceeded.

When the job remedial process comprises canceling the job plan, a determination is made whether to cancel the job plan, at step 386.

When it is determined that the job plan should not be canceled, the one or more tasks to be performed are modified and/or rescheduled based on the job plan, the availability of the resources and/or assets, and the one or more weather forecasts. The process may be repeated for dependent job tasks that are also impacted by this weather reschedule. For example, the tasks may be modified to use different resources appropriate for the new weather conditions, or the tasks may be moved to another day when weather conditions are predicted to be within the specified weather threshold. Otherwise, the job plan is canceled and process 300 ends. In either case, a message may be sent by server 130 to client device 110 advising a user associated with the client device that the job plan has been modified, rescheduled or canceled.

When it is determined that each of the weather forecasts related to the one or more scheduled times (e.g., one or more dates) is within or otherwise meets the weather threshold information, a determination is made as to whether the job plan has been successfully completed, at step 390. For example, if a pre-configured threshold level comprises a maximum estimated likelihood of rain for a specific location and date as fifty percent, and a weather forecast generated by weather module 220 related to the specific location indicates that the likelihood of rain occurring on the date is twenty percent, server 130 may determine that the weather forecast meets the weather threshold information because twenty percent is within the threshold of fifty percent and seek confirmation that the job has been completed before terminating the process.

When it is determined that the job plan has not been successfully completed, weather information is periodically monitored and analyzed to determine and/or update weather forecasts related to the one or more dates. The weather forecast information may be received periodically, at predetermined times in advance of when the tasks are scheduled to occur, or upon demand. Otherwise, process 300 ends.

Advantages of the present invention embodiments may include real-time monitoring of weather information from one or more weather services to dynamically schedule or reschedule a work plan based on the weather information and job threshold information included in a work order to complete one or more tasks. Based on the monitoring of weather information, the system may automatically modify and/or reschedule a job plan to occur during a time (e.g., on one or more dates or one or more time periods on one or more dates) for which the weather forecasts are expected to be within the job threshold information. In so doing, the system may automatically reserve personnel and/or resources needed to complete the one or more work orders included in the job plan. The system may further dynamically generate an alert signal to notify a user that job threshold information associated with the one or more work orders is expected to be exceeded, enabling a user to reschedule the one or more work orders to occur on one or more times (e.g., one or more dates or one or more time periods on one or more dates) for which the job threshold information is not expected to be exceeded.

It will be appreciated that the embodiments described above and illustrated in the drawings represent only a few of the many ways of implementing embodiments for dynamically scheduling a job plan based on weather information.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.).

The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., scheduling manager, weather module, resource mapping module, scheduler engine, alert module, etc.). These systems may include any types of monitors and input devices (e.g., keyboard, mouse, voice recognition, etc.) to enter and/or view information.

It is to be understood that the software (e.g., scheduling manager, weather module, resource mapping module, scheduler engine, alert module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g. scheduling manager, weather module, resource mapping module, scheduler engine, alert module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store job plan configuration data and/or weather information. The database system may be implemented by any number of any conventional or other databases, data stores or storage structures (e.g., files, databases, data structures, data or other repositories, etc.) to store job plan information (e.g., weather threshold information, weather information, weather forecasts, etc.). The database system may be included within or coupled to the server and/or client systems. The database systems and/or storage structures may be remote from or local to the computer or other processing systems, and may store any desired data (e.g., weather threshold information, weather information, weather forecasts, etc.).

The present invention embodiments may employ any number of any type of user interface (e.g., Graphical User Interface (GUI), command-line, prompt, etc.) for obtaining or providing job plan configuration information (e.g., weather threshold information, task descriptions, resource requirements, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion. The report may include any information arranged in any fashion, and may be configurable based on rules or other criteria to provide desired information to a user (e.g., job plan scheduling information, alarm signal, etc.).

The present invention embodiments are not limited to the specific tasks or algorithms described above, but may be utilized for any type of job plan (e.g., MROs, commercial construction, residential construction, etc.) to perform any type of alert signal generation (e.g., texts, ringing, alarm and/or device control, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be associated with the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above, it will be appreciated that example embodiments of the invention allow a work order to be automatically scheduled and/or modified based on predicted weather information. For example, when a work order including information describing one or more tasks to be performed, and information describing a weather threshold, such as lack of rain, or certain temperature range associated with the one or more tasks, is received via an electronic communications network, a job plan may be created that includes the tasks and, determines an amount and type of resources needed to complete the tasks, and one or more dates and/or times may be scheduled when the tasks are to be performed based on an availability of the amount and type of resources needed to complete the one or more tasks, and within a predicted weather window that matches or exceeds the specified weather threshold for the task. Weather forecast information may periodically be received via an electronic communications network from one or more weather information providers, and based on the weather forecast information, it can be predicted whether the weather threshold associated with the one or more tasks will be missed on the one or more dates and/or times when one or more tasks are scheduled to be performed. When it is predicted that the one or more weather thresholds will be missed, a job plan remedial process to reschedule the task may be initiated. In an example embodiment, the job plan remedial process may be automatically initiated without user intervention. It will be appreciated that aspects of the example embodiments, such as communication modules that obtain weather forecast information and modules that use such weather forecast information and weather thresholds to schedule and/or modify job plans, may be added to existing computerized scheduling systems to provide enhanced scheduling capability using weather information, thereby improving functionality of such computerized scheduling systems.

What is claimed is:

1. A computer-implemented method of dynamically scheduling a work order based on weather information comprising:
   receiving, via an electronic communications network, an electronic work order, wherein the electronic work order includes information describing one or more tasks to be performed;
   determining one or more weather thresholds and associations between the one or more weather thresholds and the one or more tasks by using a machine learning model to process the information describing the one or more tasks, wherein the machine learning model is trained using historical data of tasks performed and weather conditions existing when the tasks were performed, and wherein each of the one or more weather thresholds comprises one of a maximum estimated likelihood of precipitation and a minimum continuous interval during which a specific weather condition is satisfied;
   creating a job plan based on the work order, wherein the job plan includes the one or more tasks and the one or more weather thresholds;
   determining an amount and type of resources needed to complete the one or more tasks;
   scheduling the one or more tasks to be performed based on an availability of the amount and type of resources needed to complete the one or more tasks;
   receiving, via an electronic communications network, weather forecast information from one or more weather information providers, and, based on the weather forecast information, predicting whether or not the one or more weather thresholds associated with the one or more tasks will be met when the one or more tasks are scheduled to occur; and
   when it is predicted that a weather threshold will not be met, initiating a job plan remedial process.

2. The computer-implemented method of claim 1, further comprising, prior to scheduling the one or more tasks to be performed, receiving via an electronic communications network, weather forecast information from the one or more weather information providers and wherein scheduling is further based on the weather forecast information.

3. The computer-implemented method of claim 1 wherein initiating the job plan remedial process comprises modifying the job plan.

4. The computer-implemented method of claim 3, wherein modifying the job plan comprises:

based on the weather forecast information received after scheduling, determining when the one or more weather thresholds associated with the one or more tasks will be met; and rescheduling the one or more tasks to be completed for when the one or more weather thresholds associated with the one or more tasks will be met.

5. The computer-implemented method of claim 1, wherein initiating the job plan remedial process comprises:
generating an electronic notification for a user that the one or more weather thresholds associated with the one or more tasks is not expected to be met; and
forwarding, via an electronic communications network, the electronic notification to a user device associated with the user.

6. The computer-implemented method of claim 1, wherein initiating the job plan remedial process comprises canceling the job plan.

7. The computer-implemented method of claim 4, further comprising determining that one or more tasks associated with another electronic work order are dependent on the one or more tasks to be rescheduled, and rescheduling the one or more dependent tasks using weather forecast information.

8. A system for dynamically scheduling a work order based on weather information comprising:
at least one processor configured to:
receive, via an electronic communications network, an electronic work order, wherein the electronic work order includes information describing one or more tasks to be performed;
determine one or more weather thresholds and associations between the one or more weather thresholds and the one or more tasks by using a machine learning model to process the information describing the one or more tasks, wherein the machine learning model is trained using historical data of tasks performed and weather conditions existing when the tasks were performed, and wherein each of the one or more weather thresholds comprises one of a maximum estimated likelihood of precipitation and a minimum continuous interval during which a specific weather condition is satisfied;
create a job plan based on the work order, wherein the job plan includes the one or more tasks and the one or more weather thresholds;
determine an amount and type of resources needed to complete the one or more tasks;
schedule the one or more tasks to be performed based on an availability of the amount and type of resources needed to complete the one or more tasks;
receive, via an electronic communications network, weather forecast information from one or more weather information providers, and, based on the weather forecast information, predicting whether or not the one or more weather thresholds associated with the one or more tasks will be met when the one or more tasks are scheduled to occur; and
when it is predicted that a weather threshold will not be met, initiate a job plan remedial process.

9. The system of claim 8, wherein the processor is further configured to:
prior to scheduling the one or more tasks to be performed, receive via an electronic communications network, weather forecast information from the one or more weather information providers and wherein scheduling is further based on the weather forecast information.

10. The system of claim 8, wherein initiating the job plan remedial process comprises modifying the job plan.

11. The system of claim 10, wherein modifying the job plan comprises:
based on the weather forecast information received after scheduling, determining when the one or more weather thresholds associated with the one or more tasks will be met; and
rescheduling the one or more tasks to be completed for when the one or more weather thresholds associated with the one or more tasks will be met.

12. The system of claim 8, wherein initiating the job plan remedial process comprises:
generating an electronic notification for a user that the one or more weather thresholds associated with the one or more tasks is not expected to be met; and
forwarding, via an electronic communications network, the electronic notification to a user device associated with the user.

13. The system of claim 8, wherein initiating the job plan remedial process comprises canceling the job plan.

14. The system of claim 11, further comprising determining that one or more tasks associated with another electronic work order are dependent on the one or more tasks to be rescheduled, and rescheduling the one or more dependent tasks using weather forecast information.

15. A computer program product for dynamically scheduling a work order based on weather information comprising:
a computer readable storage medium having program instructions embodied therewith, the program instructions executable by at least one processor to cause the at least one processor to:
receive, via an electronic communications network, an electronic work order, wherein the electronic work order includes information describing one or more tasks to be performed;
determine one or more weather thresholds and associations between the one or more weather thresholds and the one or more tasks by using a machine learning model to process the information describing the one or more tasks, wherein the machine learning model is trained using historical data of tasks performed and weather conditions existing when the tasks were performed, and wherein each of the one or more weather thresholds comprises one of a maximum estimated likelihood of precipitation and a minimum continuous interval during which a specific weather condition is satisfied;
create a job plan based on the work order, wherein the job plan includes the one or more tasks and the one or more weather thresholds;
determine an amount and type of resources needed to complete the one or more tasks;
schedule the one or more tasks to be performed based on an availability of the amount and type of resources needed to complete the one or more tasks;
receive, via an electronic communications network, weather forecast information from one or more weather information providers, and, based on the weather forecast information, predict whether or not the one or more weather thresholds associated with the one or more tasks will be met when the one or more tasks are scheduled to occur; and
when it is predicted that a weather threshold will not be met, initiate a job plan remedial process.

16. The computer program product of claim 15, wherein the program instructions are further configured to cause the at least one processor to:
- prior to scheduling the one or more tasks to be performed, receive via an electronic communications network, weather forecast information from the one or more weather information providers and wherein scheduling is further based on the weather forecast information.

17. The computer program product of claim 15, wherein initiating the job plan remedial process comprises modifying the job plan.

18. The computer program product of claim 17, wherein modifying the job plan comprises:
- based on the weather forecast information received after scheduling, determining when the one or more weather thresholds associated with the one or more tasks will be met; and
- rescheduling the one or more tasks to be completed for when the one or more weather thresholds associated with the one or more tasks will be met.

19. The computer program product of claim 15, wherein initiating the job plan remedial process comprises:
- generating an electronic notification for a user that the one or more weather thresholds associated with the one or more tasks is expected to not be met; and
- forwarding, via an electronic communications network, the electronic notification to a user device associated with the user.

20. The computer program product of claim 15, wherein initiating the job plan remedial process comprises canceling the job plan.

* * * * *